(12) United States Patent
Anguelouch et al.

(10) Patent No.: US 8,074,345 B1
(45) Date of Patent: Dec. 13, 2011

(54) METHOD OF MEASURING A BEVEL ANGLE IN A WRITE HEAD

(75) Inventors: Alexandre Anguelouch, Fremont, CA (US); Donghong Li, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 151 days.

(21) Appl. No.: 12/468,006

(22) Filed: May 18, 2009

(51) Int. Cl.
*G11B 5/127* (2006.01)
*H04R 31/00* (2006.01)

(52) U.S. Cl. ............... 29/603.16; 29/603.13; 29/603.14; 29/603.15; 29/603.18; 216/62; 216/65; 216/66; 360/121; 360/122; 360/317; 360/324; 360/327; 451/5; 451/41

(58) Field of Classification Search ............... 29/603.07, 29/603.13–603.16, 603.18; 216/62, 65, 66; 360/121, 122, 317, 324–327; 451/5, 41
See application file for complete search history.

(56) References Cited

U.S. PATENT DOCUMENTS

| | | | |
|---|---|---|---|
| 6,564,445 B1 | 5/2003 | Hashimoto et al. | |
| 6,760,197 B2 | 7/2004 | Boutaghou et al. | |
| 7,469,466 B2 | 12/2008 | Beach et al. | |
| 7,480,983 B2 | 1/2009 | Lo | |
| 2007/0098246 A1 | 5/2007 | Miyatake et al. | |
| 2009/0168242 A1* | 7/2009 | Liu | 360/125.12 |

FOREIGN PATENT DOCUMENTS

JP  2003-051106 A  2/2003

* cited by examiner

*Primary Examiner* — Paul D Kim

(57) ABSTRACT

A method of measuring a bevel angle in a write pole comprises the step of providing a mask over a wafer containing the write pole. The mask has a first opening over the write pole and a second opening over a sacrificial region of the wafer. The sacrificial region comprises a same material as the write pole. The method further comprises the steps of performing a beveling operation on the write pole and the sacrificial region to form a first bevel in the write pole and a second bevel in the sacrificial region, and measuring an angle of the second bevel in the sacrificial region to determine the bevel angle of the write pole.

13 Claims, 6 Drawing Sheets

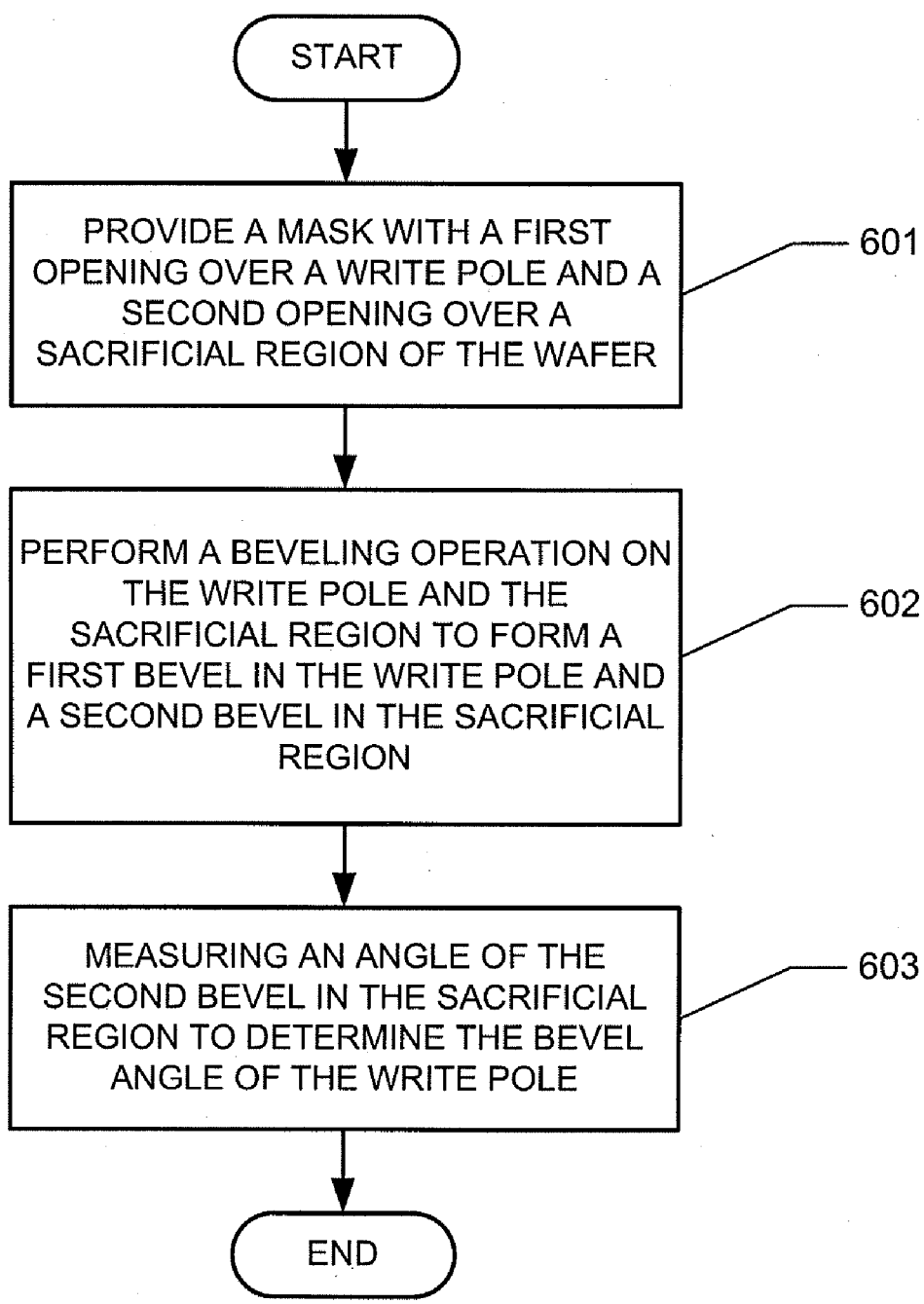

METHOD OF MEASURING A BEVEL ANGLE IN A WRITE HEAD

FIELD OF THE INVENTION

The present invention generally relates to hard disk drives and, in particular, relates to metrology of a writer pole bevel using a proxy structure.

BACKGROUND OF THE INVENTION

Hard disk drives include one or more rigid disks, which are coated with a magnetic recording medium in which data can be stored. Hard disk drives further include read and write heads for interacting with the data in the magnetic recording medium. The write head includes an inductive element for generating a magnetic field that aligns the magnetic moments of domains in the magnetic recording medium to represent bits of data.

Magnetic recording techniques include both longitudinal and perpendicular recording. Perpendicular magnetic recording ("PMR") is a form of magnetic recording in which the magnetic moments representing bits of data are oriented perpendicularly to the surface of the magnetic recording medium, as opposed to longitudinally along a track thereof. PMR enjoys a number of advantages over longitudinal recording, such as significantly higher areal density recording capability.

Some PMR write poles are provided with a bevel near the air bearing surface, which allows the majority of the write pole to have a large thickness while providing a desirable thin pole tip. Forming such a bevel in a PMR write pole presents numerous manufacturing challenges, as does the accurate determination of the bevel angle produced by various fabrication processes. Because a PMR write pole is very small (e.g., frequently having a track width of less than 100 nm), the direct measurement of the angle thereof is painstakingly difficult and frequently unreliable.

SUMMARY OF THE INVENTION

Various embodiments of the present invention solve the foregoing problems by providing methods for measuring the bevel angle of a write pole indirectly, using a proxy structure located near the write pole. By subjecting the much larger proxy structure to the same bevel formation steps as the write pole, the bevel created in the proxy region has substantially the same angle as the bevel created on the write pole, and is much simpler to measure, due to the proxy structure's larger size.

According to one embodiment of the subject disclosure, a method of measuring a bevel angle in a write pole comprises the step of providing a mask over a wafer containing the write pole. The mask has a first opening over the write pole and a second opening over a sacrificial region of the wafer. The sacrificial region comprises a same material as the write pole. The method further comprises the steps of performing a beveling operation on the write pole and the sacrificial region to form a first bevel in the write pole and a second bevel in the sacrificial region, and measuring an angle of the second bevel in the sacrificial region to determine the bevel angle of the write pole.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 6 is a flowchart illustrating a method of measuring a bevel angle in a write pole in accordance with one aspect of the subject disclosure.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
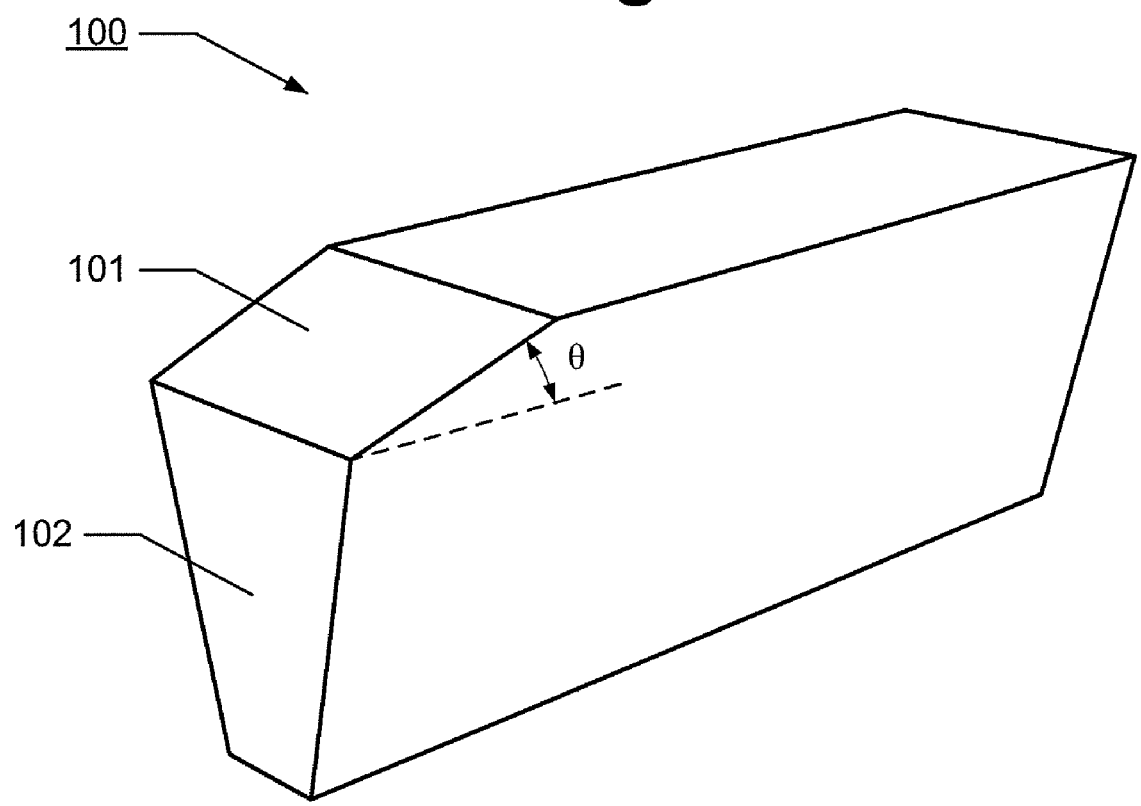
FIG. 1 illustrates an isometric view of a beveled write pole in accordance with on aspect of the subject disclosure.

FIG. 1 illustrates an isometric view of a beveled write pole 100 in accordance with on aspect of the subject disclosure. Write pole 100 includes a bevel 101 that reduces the height of write pole 100 near the air bearing surface 102 thereof. Bevel 101 is oriented at an angle θ with respect to the upper surface of write pole 100. Directly measuring this angle can be a significant challenge, given the extraordinarily small dimensions of the write pole.

Figure 2:
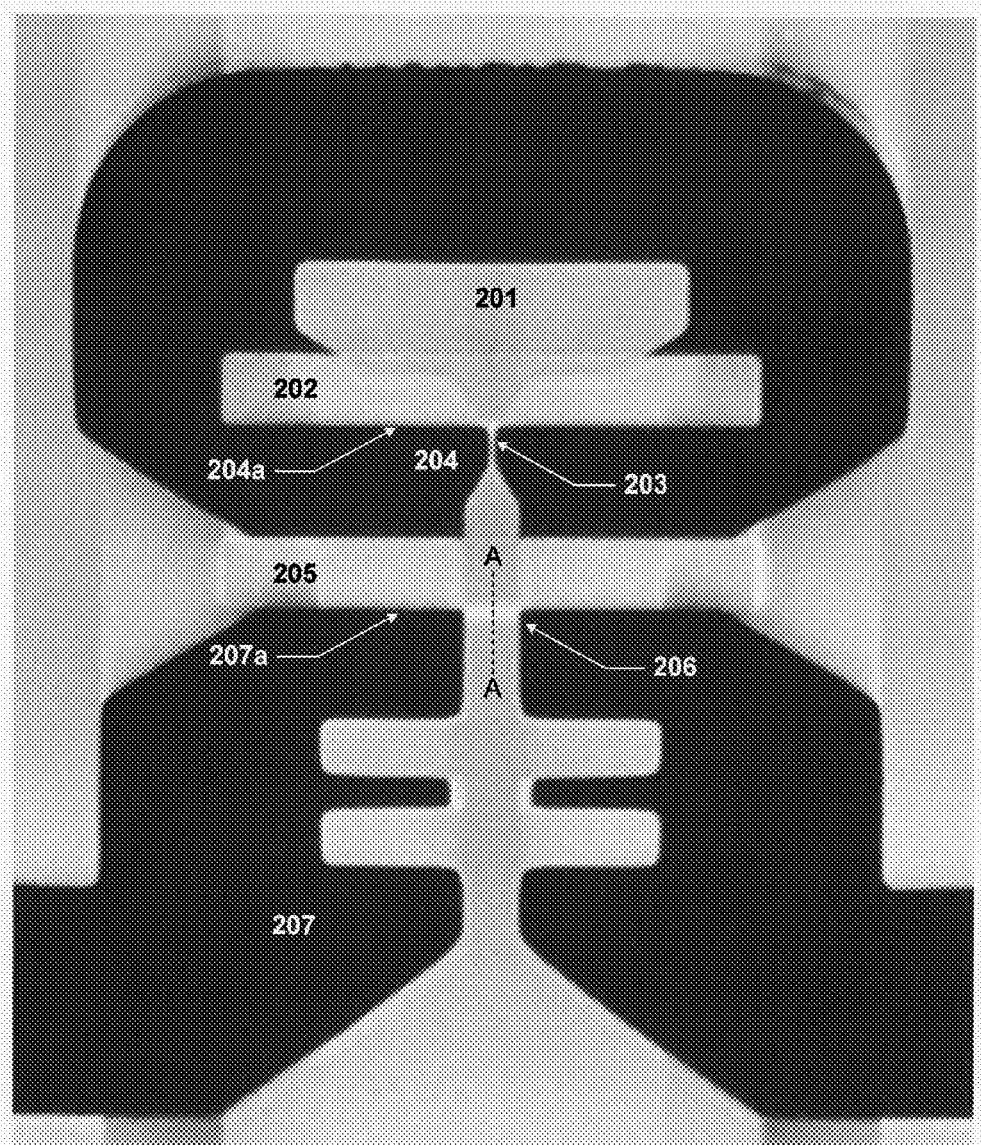
FIG. 2 illustrates a site on a wafer containing a write pole and a proxy structure, over which a mask layer has been disposed, in accordance with one aspect of the subject disclosure.

To address this challenge, various embodiments of the present invention provide methods for indirectly measuring the bevel angle in a write pole. For example, FIG. 2 illustrates a partial overhead view a site on a wafer containing a write pole and a proxy structure used to determine a bevel angle of the write pole, in accordance with one aspect of the subject disclosure. The write pole includes a broad yoke region 201 and a narrow nose region 203, on the upper surface of which a bevel is to be formed. To facilitate the formation of the bevel in nose region 203 of the write pole, a mask layer is formed with a mask region 202 adjacent to an opening 204 over nose region 203. The mask layer may comprise, alumina, photoresist, or any one of a number of other materials known to those of skill in the art.

The bevel is formed in nose region 203 of write pole by subjecting nose region to one or more milling operations, such as ion beam milling. To facilitate the measurement of the bevel angle formed in nose region 203, the mask layer includes another mask region 205 defining a second opening 207, by which a proxy structure 206 is also exposed to the etching operation. By performing the same etching operation over both exposed areas (i.e., nose region 203 and proxy structure 206), a bevel with substantially the same angle as the bevel of nose region 203 can be formed in proxy structure 206. Because proxy structure 206 is much wider than nose region 203 (i.e., in the cross-track direction), accurate measurement of the bevel angle in proxy structure 206 is much easier than measurement of the bevel angle in nose region 203. For example, proxy structure 206 may be 10×, 100×, or even 1000× wider than nose region 203, such that accurate positioning of a FIB trench for SEM measurement of the bevel angle is greatly simplified, as is discussed in greater detail below.

In accordance with one aspect of the subject disclosure, proxy region 206 is formed in the same layer of the wafer as nose region 203 of the write pole. For example, yoke region 201, nose region 203 and proxy region 206 may all comprise a single layer of the same material (e.g., CoNiFe), whereby the beveling operation (e.g., etching, ion beam milling or the like) encounters the same material in nose region 203 and proxy region 206. In some embodiments, the write pole may be a multi-layer structure, and the proxy region may be the same multilayer structure formed at the same time as the write pole. By ensuring that the nose region of the write pole is made from the same material and is disposed in the same layer as the proxy structure, the beveling operation will produce substantially the same bevel angle in the proxy region as in the nose region. Moreover, as the proxy region is disposed very close to the nose region (e.g., at the same site on the wafer), intra-wafer variations in the milling, photoresist and CMP operations will be minimized, further ensuring a close match in bevel angle between the proxy region and the nose region.

Figure 3:
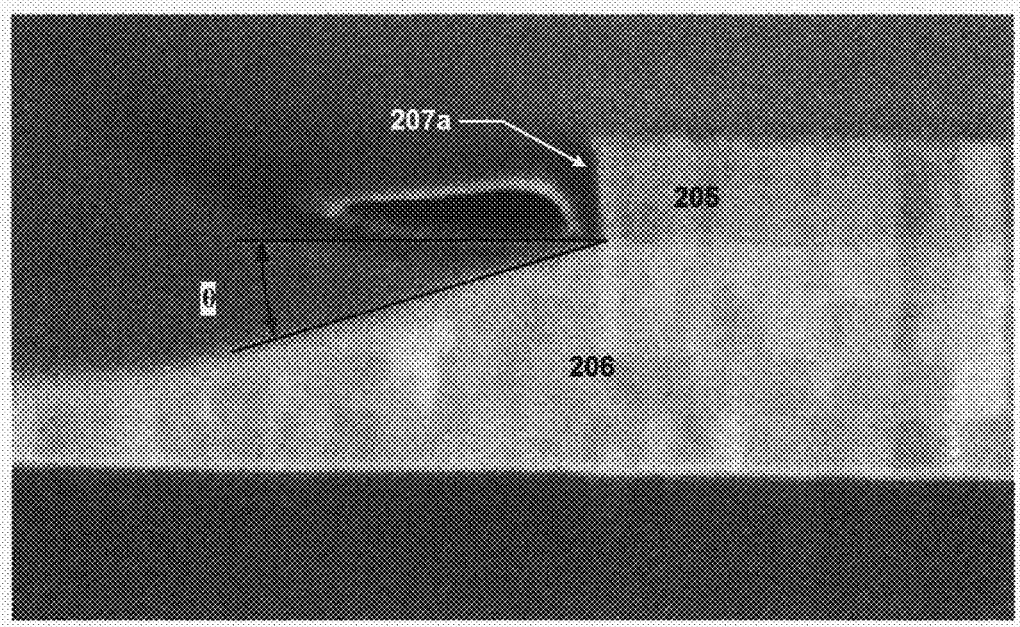
FIG. 3 illustrates a cross-section of a beveled proxy structure in accordance with one aspect of the subject disclosure.

According to one aspect of the subject disclosure, openings 204 and 207 each have an edge which shadows a region of write pole 203 and proxy region 206, respectively, in which bevels are formed. For example, edge 204a of opening 204 (where opening 204 and mask region 202 intersect) shadows a portion of nose region 203 in which a bevel is formed, and edge 207a of opening 207 (where opening 207 and mask region 205 intersect) shadows a portion of proxy structure 206 in which a bevel is formed. This may be more readily understood with reference to FIG. 3, which illustrates a cross-section (along axis A-A of FIG. 2) of proxy structure 206 in accordance with one aspect of the subject disclosure. As can be seen with reference to FIG. 3, region 205 of the mask layer has an edge 207a which shadows the proxy region 206, such that an ion beam milling process performed at an angle to the wafer (or sweeping through a range of angles) forms a beveled surface at an angle θ with respect to the upper surface of proxy region 206.

By orienting the edges of the openings over the nose region and the proxy region substantially parallel to one another, the bevel surfaces formed in the regions adjacent to the edges will be substantially parallel, thereby facilitating measurement of the bevel angles thereof. Moreover, the edge which shadows the nose region may be oriented substantially parallel to the eventual air bearing surface of write pole, so that the writer pole bevel intersects the air bearing surface thereof at a constant height.

One benefit to the exemplary configuration of a proxy region illustrated in FIG. 2 is that the proxy region may be sacrificial (e.g., the proxy region may be removed during the lapping of the magnetic head in which the write pole is disposed). By providing a proxy region for bevel processing on an opposite side of an eventual air bearing surface of the write pole, the bevel formed in the proxy region, together with the mask layer and any other byproduct of the bevel angle measurement (e.g., FIB trench cuts, etc.) can be removed from the magnetic head before it is incorporated into a disk drive.

While FIG. 2 has illustrated a single site on a wafer including a single write pole, a wafer may include numerous substantially identical write poles, as will be readily understood by those of skill in the art. In this regard, the mask layer may be provided with two openings for each write pole in the wafer, whereby each write pole may have a corresponding proxy region with a bevel angle substantially identical to the bevel angle of the write pole. In this fashion, the bevel angle for multiple write poles on a single wafer can easily be determined, to ensure intra- and inter-wafer consistency.

Figure 4A:
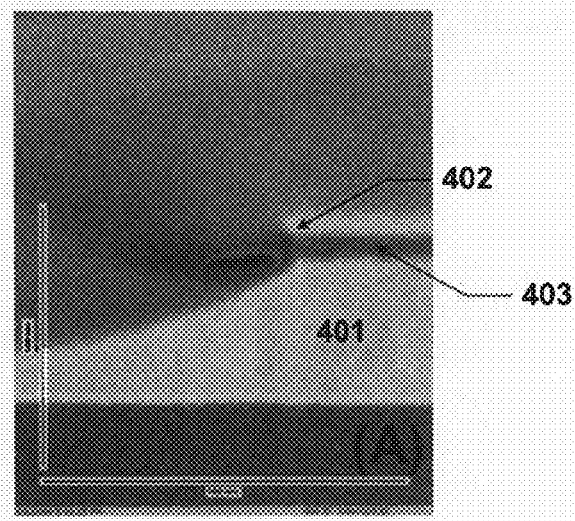
FIG. 4a illustrates a cross-section of a beveled proxy structure in accordance with one aspect of the subject disclosure.
Figure 4B:
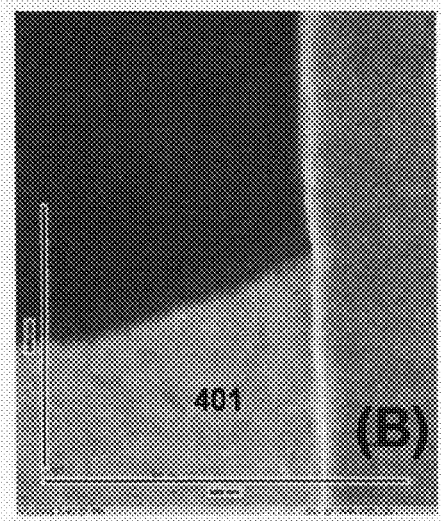
FIGS. 4b and 4c illustrate tilt-beam views of a beveled proxy structure and a beveled write pole in accordance with various aspects of the subject disclosure.

FIG. 4a illustrates a cross-section of another exemplary beveled proxy structure in accordance with one aspect of the subject disclosure. The SEM image of FIG. 4a was obtained by using a focused ion beam (FIB) to form a trench intersecting the proxy structure 401 bevel at a right angle to the edge 402 of the mask layer 403, and then using a SEM to obtain a view of the facet in the resulting trench at a 45° angle. FIG. 4b, by way of comparison, illustrates the same beveled proxy structure 401 when imaged with a tilt-beam SEM (i.e., without forming a FIB trench), in accordance with another aspect of the subject disclosure. A simple geometrical consideration illustrates the bevel angle seen in FIG. 4b is the same angle obtained in the apex FIB cut of FIG. 4a.

Figure 4C:
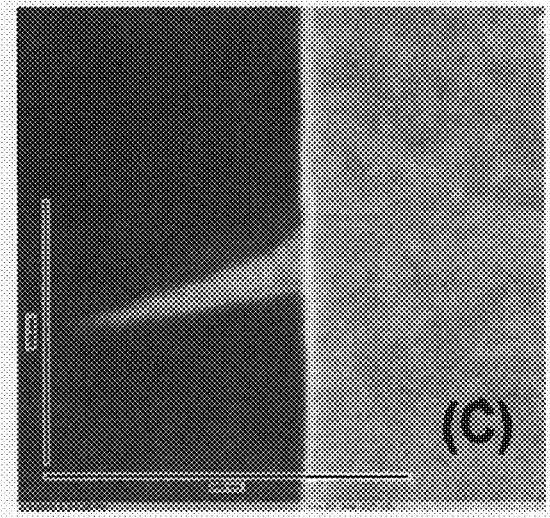

As the FIB trench cut is not required to determine the angle of the proxy structure, a dual-beam FIB/SEM tool is not necessary to determine the angle of the proxy structure (and therefore the angle of the write pole). Rather, only an SEM (or a similar scanning probe microscopy device, such as an atomic force microscopy device) is required. In contrast, the tilt-beam SEM image of a write pole in FIG. 4c, which corresponds to the proxy structures illustrated in FIGS. 4a and 4b, can not easily be used to determine the bevel angle of the write pole (as the dimensions thereof are so small as to render measurement of the angle prohibitively difficult).

Figure 5:
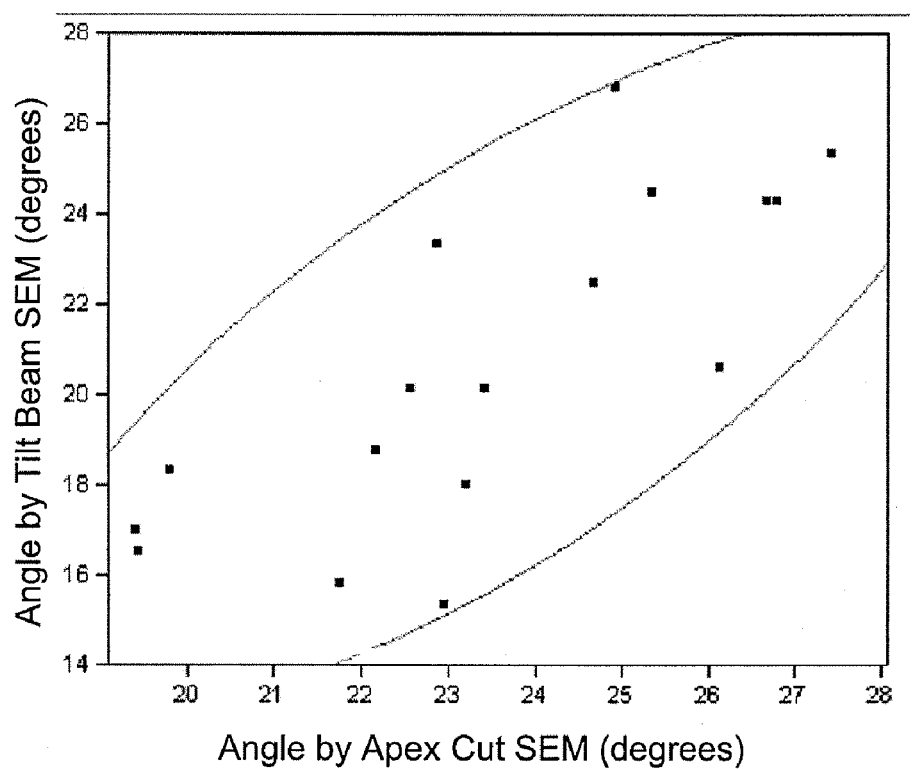
FIG. 5 is a graph illustrating the correlation between cross-sectional measurements and tilt-beam measurements of beveled angles in accordance with one aspect of the subject disclosure.

FIG. 5 is a graph illustrating the correlation between cross-sectional measurements (e.g., using a dual beam FIB-SEM) and tilt-beam measurements (e.g., using only a SEM) of beveled angles on several exemplary proxy structures in accordance with one aspect of the subject disclosure. The bivariate normal ellipse illustrated in the graph of FIG. 5 has a correlation coefficient P of 0.900. The 17 data points represented in the graph of FIG. 5 have a correlation of 0.76983 and a significance probability of 0.0003. In this regard, the bevel angles measured with a dual beam FIB-SEM (on the horizontal axis) have a means of 23.504, and a standard deviation of 2.547534, while the corresponding bevel angles measured using tilt-beam SEM (on the vertical axis) have a mean of 20.63881 and a standard deviation of 3.619852.

FIG. 6 is a flowchart illustrating a method of measuring a bevel angle in a write pole in accordance with one aspect of the subject disclosure. The method begins with step 601, in which a mask is provided over a wafer containing the write pole. The mask has a first opening over the write pole and a second opening over a sacrificial region of the wafer. The sacrificial region comprises a same material as the write pole. In step 602, a beveling operation is performed on the write pole and the sacrificial region to form a first bevel in the write pole and a second bevel in the sacrificial region. In step 603, an angle of the second bevel in the sacrificial region is measured to determine the bevel angle of the write pole.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A method of measuring a bevel angle in a write pole, comprising the steps of:
   providing a mask over a wafer containing the write pole and a proxy structure, the mask having a first opening over the write pole and a second opening over the proxy structure of the wafer, the proxy structure comprising a same material as the write pole;
   performing a beveling operation on the write pole and the proxy structure to form a first bevel in the write pole and a second bevel in the proxy structure; and
   measuring an angle of the second bevel in the proxy structure to determine an angle of the first bevel of the write pole.

2. The method according to claim 1, wherein the angle of the second bevel in the proxy structure is substantially the same as the angle of the first bevel of the write pole.

3. The method according to claim 1, wherein a first edge of the mask adjacent the first opening is substantially parallel to a second edge of the mask adjacent the second opening.

4. The method according to claim 3, wherein the first bevel is formed in a region of the write pole shadowed by the first edge, and wherein the second bevel is formed in a region of the proxy structure shadowed by the second edge.

5. The method according to claim 3, wherein the first edge is parallel to an air bearing surface of the write pole.

6. The method according to claim 1, wherein the same material of the proxy structure and the write pole comprises a same layer of magnetic material.

7. The method according to claim 1, wherein the first opening is on an opposite side of an air bearing surface than the second opening.

8. The method according to claim 1, wherein the step of measuring the angle of the second bevel comprises milling a trench intersecting the second bevel and measuring the angle of the second bevel using scanning probe microscopy.

9. The method according to claim 1, wherein the step of measuring the angle of the second bevel does not comprise milling a trench intersecting the second bevel.

10. The method according to claim 1, wherein the step of performing the beveling operation comprises ion beam milling.

11. The method according to claim 1, wherein the proxy structure is at least ten times wider than the write pole region.

12. The method according to claim 1, wherein the mask comprises photoresist or alumina.

13. The method according to claim 1, wherein the write pole is one of a plurality of write poles in the wafer.

* * * * *